United States Patent

Mills et al.

[11] Patent Number: 5,997,144
[45] Date of Patent: Dec. 7, 1999

[54] SEALED REFLECTOR APPARATUS

[75] Inventors: David Roy Mills, Roseville; Graham Lindsay Morrison, Marouba, both of Australia

[73] Assignee: Solahart Industries Pty. Ltd., Welshpool, Australia

[21] Appl. No.: 09/043,192

[22] PCT Filed: Sep. 13, 1996

[86] PCT No.: PCT/AU96/00571

§ 371 Date: Jul. 13, 1998

§ 102(e) Date: Jul. 13, 1998

[87] PCT Pub. No.: WO97/10521

PCT Pub. Date: Mar. 20, 1997

[30] Foreign Application Priority Data

Sep. 14, 1995 [AU] Australia ................. PN5448

[51] Int. Cl.⁶ .................. G02B 11/04; G02B 5/22
[52] U.S. Cl. .................. 359/514; 359/838; 359/883
[58] Field of Search .................. 359/513, 514, 359/507, 838, 883, 894; 362/477

[56] References Cited

U.S. PATENT DOCUMENTS

| | | | |
|---|---|---|---|
| 1,930,244 | 10/1933 | Lewinsohn et al. | 362/129 |
| 3,160,736 | 12/1964 | Catterson | 219/219 |
| 3,473,867 | 10/1969 | Byrnes | 359/493 |
| 3,507,563 | 4/1970 | Berman et al. | 359/603 |
| 3,542,455 | 11/1970 | Jensen | 359/605 |
| 3,709,765 | 1/1973 | Miles | 359/513 |
| 4,547,432 | 10/1985 | Pitts et al. | 428/448 |
| 5,790,298 | 8/1998 | Tonar | 359/513 |

FOREIGN PATENT DOCUMENTS

| | | | |
|---|---|---|---|
| 545921 | 2/1941 | Australia . | |
| 9454875 | 9/1994 | Australia | B60R 1/08 |
| 9480343 | 2/1995 | Australia | G02B 5/08 |
| 002818 | 2/1990 | France . | |
| 685622 | 2/1940 | Germany . | |
| 2433599 | 1/1976 | Germany | 359/883 |
| 782895 | 9/1957 | United Kingdom | 359/514 |
| 2074344 | 10/1981 | United Kingdom | 359/884 |
| 2262438 | 6/1993 | United Kingdom | A47G 1/02 |
| WO8911669 | 11/1989 | WIPO | G02B 7/18 |

*Primary Examiner*—Cassandra Spyrou
*Assistant Examiner*—John Juba, Jr.
*Attorney, Agent, or Firm*—Howard & Howard

[57] ABSTRACT

A reflector apparatus (10) having a reflective layer (24) enclosed within a sealed envelope (16) having a lower light absorptive sheet (20) and an upper light transmitting sheet (22).

4 Claims, 1 Drawing Sheet

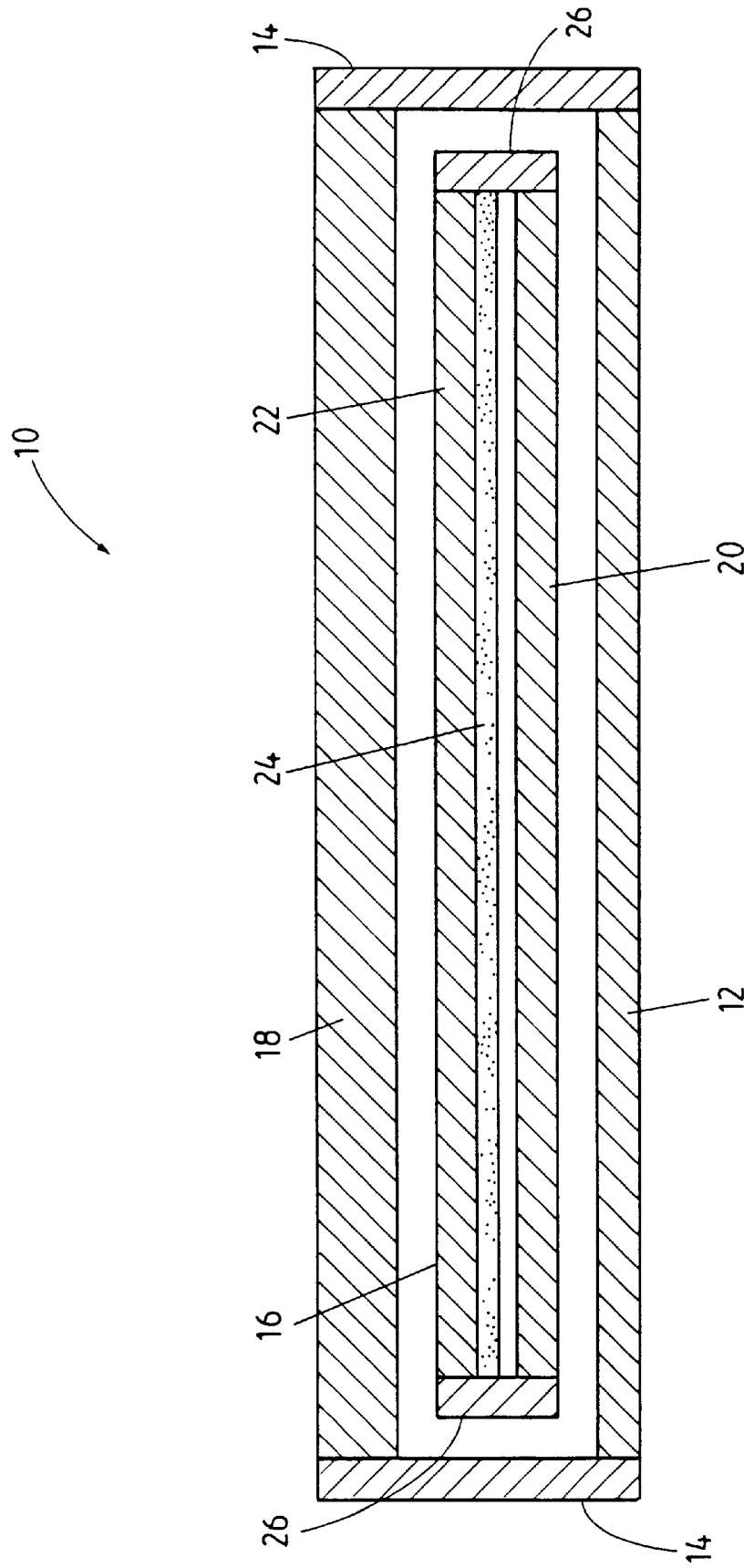

SEALED REFLECTOR APPARATUS

FIELD OF THE INVENTION

The present invention relates to a reflector apparatus.

SUMMARY OF THE INVENTION

In accordance with one aspect of the present invention there is provided a reflector apparatus comprising a reflective layer enclosed within a sealed envelope.

BRIEF DESCRIPTION OF THE DRAWING

The present invention will now be described, by way of example, with reference to the accompanying drawing which is a schematic side elevation of a reflector apparatus in accordance with the present invention.

DETAILED DESCRIPTION OF THE PREFERRED EMBODIMENT

In the drawing, there is shown a reflector apparatus 10 comprising a base 12, a wall 14 extending around the base 12, a sealed envelope 16 mounted on, to or above the base 12 and a transparent or translucent, light transmitting cover sheet 18 mounted within the wall 14 on, to or above the envelope 16.

The base 12 may be formed from a non thermally conductive material such as a rigid foam material and may be molded to any shape. The base 12 is preferably substantially impervious to liquids and gases.

The wall 14 extends around the base 12 and is upstanding relative thereto. Further, the wall 14 is sealingly connected to the base 12 by any convenient means.

The cover sheet 18 is formed of a transparent or translucent, light transmitting material such as glass, low ion glass or plastics material such as acrylic material. The cover sheet 18 is sealingly connected to the wall 14 by any convenient means.

The envelope 16 contains a lower sheet 20 and an upper sheet 22. The lower sheet 20 may be formed of plastics material such as acrylic material or any similar material. Further, the lower sheet 20 is preferably light absorptive and in this connection may be formed of a black material or have a black layer applied thereto.

The upper sheet 22 is formed of transparent or translucent light transmitting material and may be formed of a plastics material such as acrylic material or any similar material. Disposed between the lower sheet 20 and the upper sheet 22 is a reflective layer 24 which is typically formed of metal. The layer 24 may be applied to a lower face of the upper sheet 22 or to an upper face of the lower sheet 20 or to both of the aforementioned upper and lower faces. The layer 24 may be applied by a convenient means such as by spraying, sputtering or evaporation.

The metallic reflective layer 24 may be formed of silver which is a highly reflective material. Alternatively, the metallic reflective layer 24 may be formed of other metals such as aluminium.

The envelope 16 is completed by a lateral seal 26 which is affixed to edges of the sheets 20 and 22 by any convenient means such as by heat fusion or adhesive. The seal 26 prevents ingress of gases or moisture into the region between the sheets 20 and 22 and thereby preventing corrosion of the reflective layer 24.

Further each of the sheets 20 and 22 is preferably provided with an antipermeation layer in intimate contact with external faces thereof. The antipermeation layer for the lower sheet 20 may be black plastics material or aluminium foil. The antipermeation layer of the upper sheet 22 may be light transmitting and resistant to corrosion, UV radiation, bird attack and impacts. The antipermeation layer for the upper sheet 22 may be formed of a thin, flexible glass sheet, acrylic film or the like, which permits shaping of the apparatus 10. In the embodiment illustrated, the cover sheet 18 acts as an antipermeation layer.

The reflector apparatus 10 can be formed in a flat shape as shown or it can be formed into other desired shapes such as a parabolic shape.

Further, several reflector apparatuses 10 can be joined together side by side to form an overall larger reflective area.

Modifications and variations such as would be apparent to a skilled addressee are deemed within the scope of the present invention. For example, the sheets 20 and 22 could be clamped together to form the sealed envelope 16.

We claim:

1. A reflector apparatus characterised by including a housing having a base, a wall extending around the base, the wall being upstanding relative to the base and being sealingly connected to the base, and a transparent cover sheet spaced from the base and being sealingly connected to the wall, a sealed envelope contained within the housing and including a lower sheet facing the base of the housing and an upper sheet facing the cover sheet of the housing, the upper and lower sheets being formed of plastics material and at least the upper sheet being transparent, and a reflective metallic layer being located between the upper and lower sheets.

2. A reflector apparatus according to claim 1, characterised in that the sealed envelope includes a lateral seal which is affixed to edges of the upper and lower sheets.

3. A reflector apparatus according to claim 2, characterised in that the reflective layer is applied to at least one of a lower face of the upper sheet or an upper face of the lower sheet.

4. A reflector apparatus according to claim 3, characterised in that the reflective layer is applied to at least one of the upper sheet or the lower sheet by one of spraying, sputtering or evaporation.

* * * * *